United States Patent

[11] 3,528,386

| [72] | Inventor | Richard L. Morine<br>c/o Food Equipment Dev. Corporation,<br>8202 Concord Drive, Mentor, Ohio 44060 |
|---|---|---|
| [21] | Appl. No. | 766,122 |
| [22] | Filed | Oct. 9, 1968 |
| [45] | Patented | Sept. 15, 1970 |

[54] APPARATUS FOR DISPENSING PARTICULATE MATERIAL ONTO MOVING MEMBERS
7 Claims, 4 Drawing Figs.

[52] U.S. Cl. .................................................. 118/7,
118/25, 141/160, 222/161
[51] Int. Cl. ...................................................... B05c 11/00
[50] Field of Search ..................................... 222/161,
196, 202, 199, 55, 141; 118/24, 25, 7, 22; 107/43;
141/177, 160, 159

[56] References Cited
UNITED STATES PATENTS

| 907,351 | 12/1908 | Herbert, Jr. .................. | 107/43X |
| 3,140,016 | 7/1964 | Frazel............................ | 222/196 |
| 3,119,529 | 1/1964 | Maestrelli..................... | 222/202X |
| 3,294,287 | 12/1966 | Wendt........................... | 222/55 |
| 3,363,806 | 1/1968 | Blakeslee ..................... | 222/202X |

*Primary Examiner*—Stanley H. Tollberg
*Assistant Examiner*—H. S. Lane
*Attorney*—Meyer, Tilberry and Body

ABSTRACT: Apparatus for dispensing particulate material in a predetermined pattern onto a subjacent surface. The apparatus includes a frame which resiliently supports a material holding hopper with its bottom wall above and facing the subjacent surface. The bottom wall of the hopper is open in the predetermined pattern and a reticulated means, preferably wire mesh, is connected across the open pattern. The openings in the reticulated means are sized so as to be only slightly larger than the average maximum cross-section of the material particles. Additionally, selectively actuable power means are arranged to impart a relatively high frequency, short amplitude vibration to the hopper. The openings in the mesh are selected so that the material will not pass through the mesh until the hopper is vibrated. This, in effect, provides a valving action without the complexity and limitations inherent in standard valve structures.

INVENTOR.
RICHARD L. MORINE
BY
Meyer, Tilberry & Body
ATTORNEYS

Patented Sept. 15, 1970

INVENTOR.
RICHARD L. MORINE
BY Meyer, Tilberry & Body
ATTORNEYS

APPARATUS FOR DISPENSING PARTICULATE MATERIAL ONTO MOVING MEMBERS

The present invention is directed toward the dispensing art and, more particularly, to an apparatus for dispensing particulate material having a relatively uniform particle size.

The invention is especially suited for use in bakeries for dispensing material such as poppy seeds, sesame seeds, etc. onto dough pieces and will be described with particular reference thereto; however, it will be appreciated the invention is capable of broader application and could be utilized wherever it is desired to dispense, in a predetermined pattern, particulate material of relatively uniform particle size.

In the manufacture of breads, rolls and the like, it is often desirable to deposit poppy or sesame seeds, for example, on the unbaked dough pieces. Prior apparatus for accomplishing this has been of two general types. One type has comprised a simple hopper provided with a narrow dispensing slot extending across its bottom. The hopper, filled with the desired seed, was positioned above a conveyor. Pans carrying the dough pieces were conveyed beneath the hopper and the seed passed through the hopper slot onto the pieces in a continuous curtain. As is apparent, a large amount of seed was wasted with this type of apparatus since the curtain of seeds resulted in covering not only the dough pieces but also the pans and conveyor with a layer of seeds. Additionally, difficulties were experienced in controlling the quantity of seed dispensed.

The second type of apparatus commonly utilized comprised a hopper unit having downwardly directed outlet ducts extending therefrom. The ducts were positioned in a pattern to correspond to each transverse row of dough pieces to be coated. An air operated slide valve was positioned between the ducts and the hopper and arranged to rapidly open and close the ducts as the pan carrying the dough pieces passed under the hopper. This apparatus reduced seed loss, but was somewhat unsatisfactory for a variety of reasons. For example, it was relatively difficult to control the quantity of seed dispensed and it was not possible to get especially uniform dispersion of the seed. Also, because of the general arrangement of the apparatus it could not be easily designed to dispense seed over a large area or to dispense on a multiple number of rows simultaneously.

The present invention overcomes the above-noted problems and provides a highly simplified apparatus which can dispense a variety of materials in closely controllable quantities and in clearly defined patterns. The apparatus is arranged so that it can be easily changed to accommodate different materials or dispense in a variety of patterns. Further, the apparatus can be easily modified to dispense over substantially any size area or simultaneously over plural rows.

In accordance with one aspect of the invention, there is provided an improved apparatus for dispensing particulate material in a predetermined pattern onto a subjacent surface. The apparatus includes a frame which resiliently supports a material holding hopper with its bottom wall above and facing the subjacent surface. The bottom wall of the hopper is open in the predetermined pattern and a reticulated means, preferably wire mesh, is connected across the open pattern. The openings in the reticulated means are sized so as to be only slightly larger than the average maximum cross-section of the material particles. Additionally, selectively actuable power means are arranged to impart a relatively high frequency, short amplitude vibration to the hopper. As will subsequently be explained, if the openings in the mesh are properly sized relative to the particle size, the material will not pass through the mesh until the hopper is vibrated. This, in effect, provides a valving action without the complexity and limitations inherent in standard valve structures.

As can be appreciated, by controlling amplitude, frequency, or duration of the vibration, the amount of material dispensed can be closely regulated. Additionally, the particular dispensing pattern desired can be readily varied simply by varying the pattern of the open portion of the bottom wall of hopper. Likewise, a large variety of materials can be dispensed by the same basic machine merely by varying the opening sizes in the reticulated means. These features are particularly advantageous when the machine is used in small bakeries to dispense seeds and the like onto dough pieces. For example, the bottom wall of the hopper can be in the form of a removable plate. A variety of such plates can then be provided with different open patterns cut therein and wire mesh of selected size tack welded thereacross. That is, plates can be provided with openings laid out to correspond to, for example, the layout of hamburger or hot dog bun dough pieces on their respective baking pans, while other plates can be provided with openings corresponding to the layout of rolls, French bread loaves, bread pans or any other type of product or pan. The particular combination of opening patterns and mesh sizes which can be provided is relatively unlimited. Consequently, the machine has almost unlimited versatility.

Accordingly, a primary object of the invention is the provision of an improved, highly versatile apparatus for dispensing particulate material in predetermined quantities and patterns.

Another object is the provision of an apparatus of the general type described which is capable of intermittently dispensing material such as poppy or sesame seeds without the use of conventional mechanical valves.

Another object is the provision of such a machine which can be quickly changed to dispense material in any selected pattern.

A further object of the invention is the provision of a machine of the type discussed which can quickly be adjusted to dispense variable quantities of material.

A still further object is the provision of a machine which is capable of performing a wide variety of dispensing operations.

Another object is the provision of a machine of the type described which is simple in construction and reliable in operation.

These and other objects and advantages will become apparent from the following description when read in conjunction with the accompanying drawings wherein.

Figure 1:
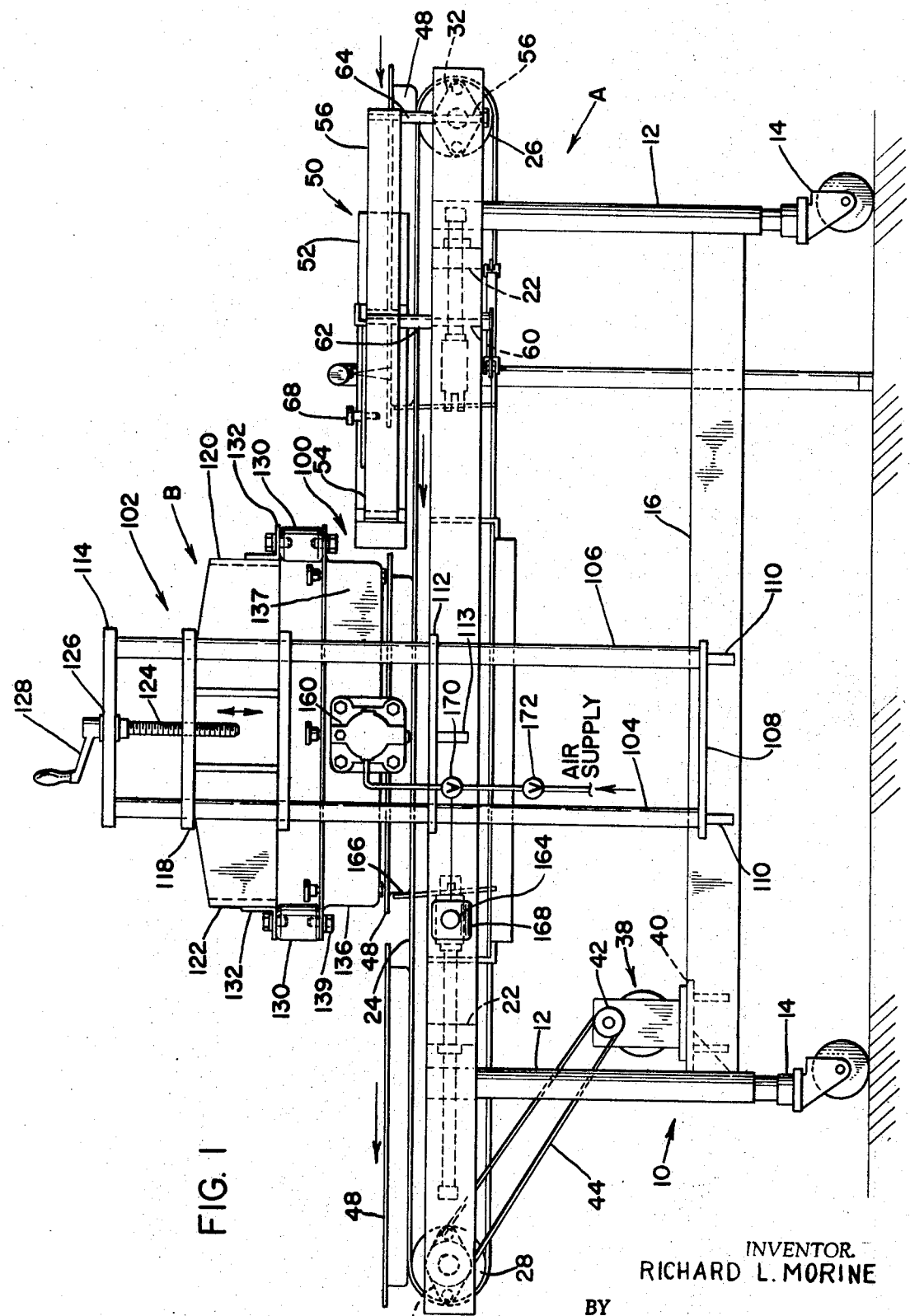
FIG. 1 is side elevational view of a dispensing apparatus formed in accordance with a preferred embodiment of the invention.
Figure 2:
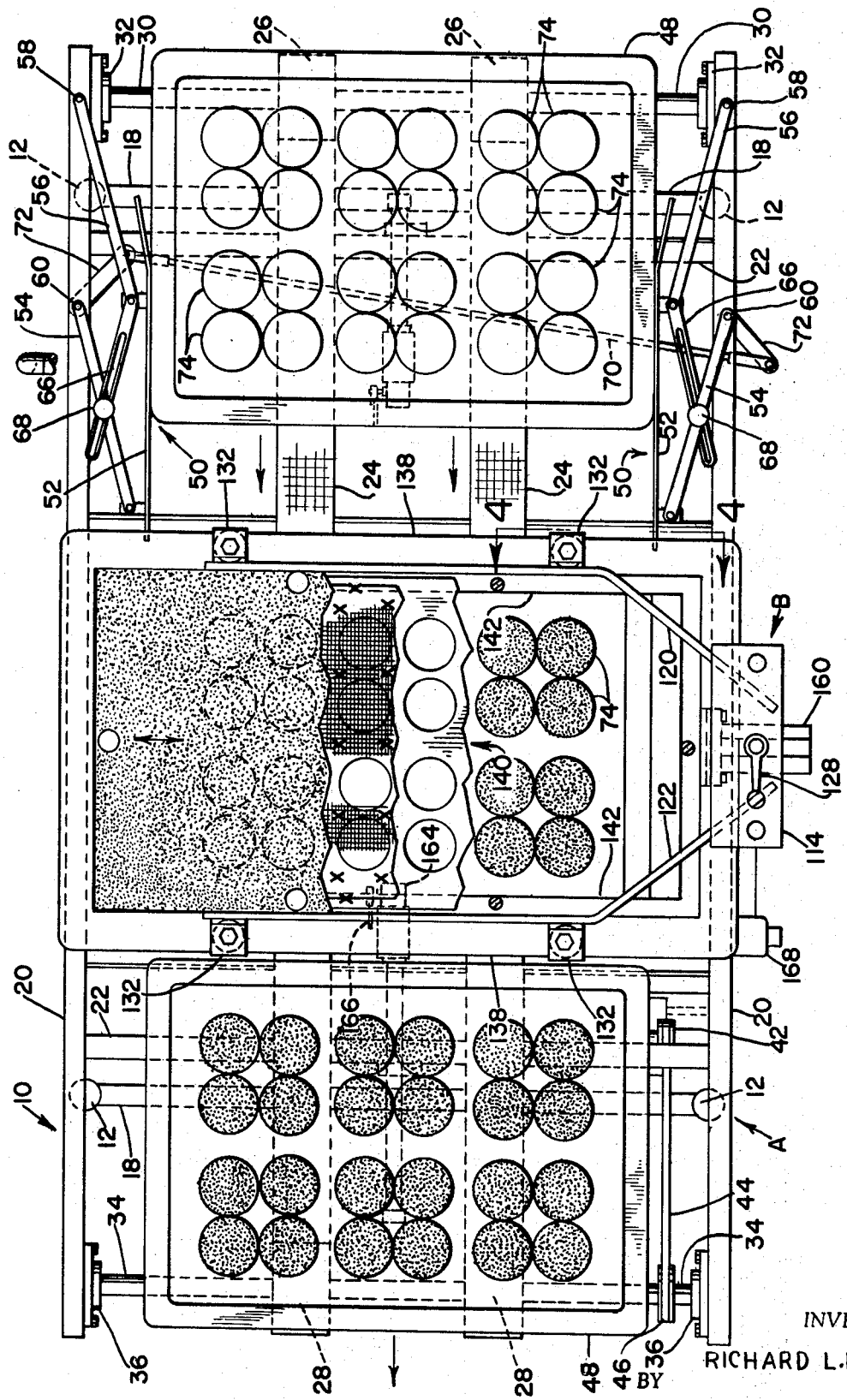
FIG. 2 is a plan view of the apparatus of FIG. 1 with certain portions broken away to more clearly show its construction.
Figure 3:
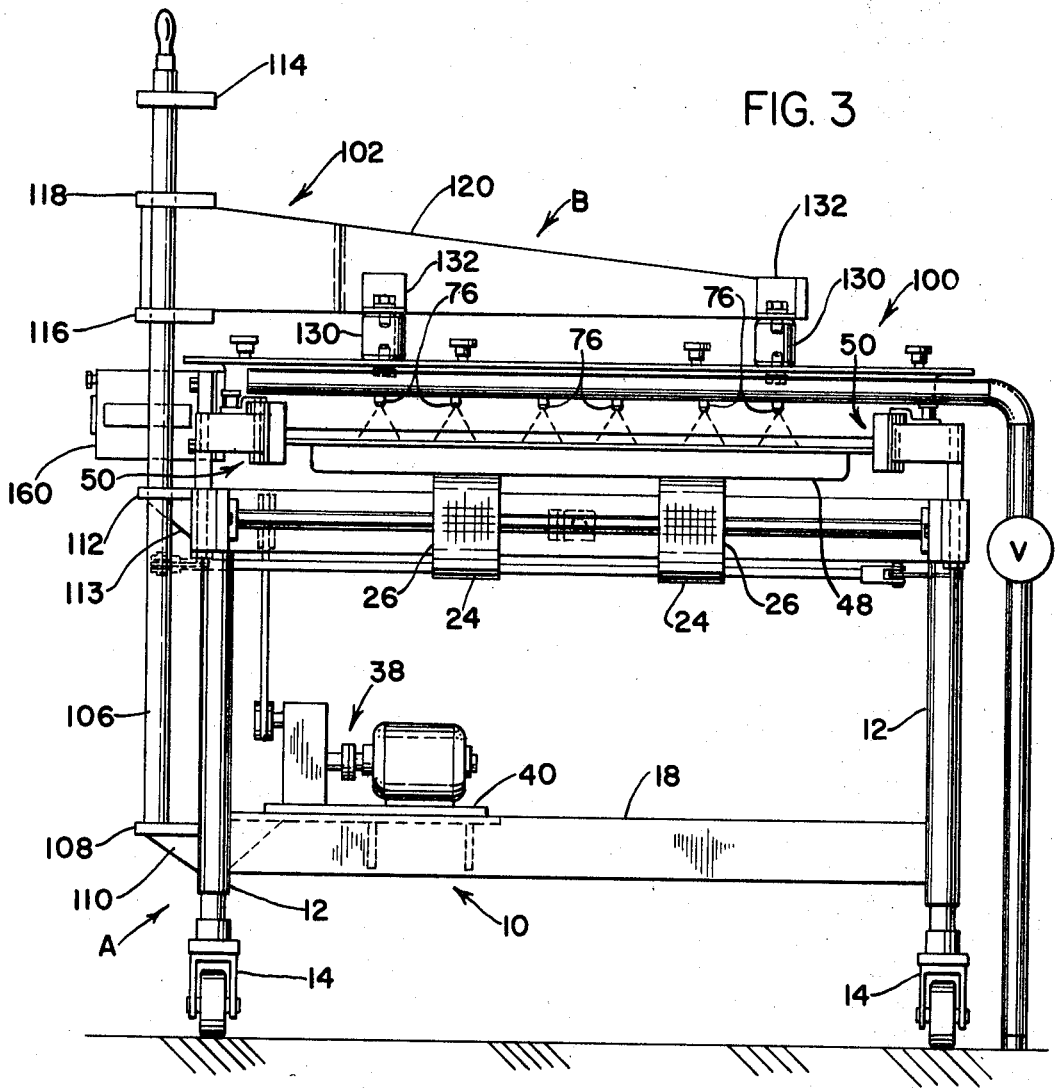
FIG. 3 is a right end view of the apparatus shown in FIG. 1.

Referring now to the drawings where the showings are for the purpose of illustrating a preferred embodiment of the invention only, and not for the purpose of limiting same, FIGS. 1—3 show the overall arrangement of a conveyor A provided with a depositing or dispensing apparatus B designed to dispense seeds or other particulate material onto surfaces or dough pieces conveyed thereunder by the conveyor A.

The conveyor A could take a variety of forms but is shown as a relatively conventional belt conveyor of the type often used in bakeries, etc. Specifically, the conveyor A comprises an elongated, portable frame 10 including four tubular legs 12 provided with heavy duty casters 14. Horizontally extending, rectangular frame members 16 and 18 are connected between the lower ends of legs 12, while the table frame of the conveyor is defined by similar members 20 and 22 welded or otherwise firmly connected to the upper ends of legs 12. Preferably, the frame members are aluminum and connected by welding.

The conveyor includes two relatively narrow belts 24 trained about two sets of drums 26, 28 mounted at opposite ends of the conveyor table frame. As shown, drums 26 are carried on a shaft 30 which is rotatably mounted in suitable bearings 32 bolted to the frame members 20 at their outermost right hand end as viewed in FIGS. 1 and 2. Drum members 28 are likewise connected to a shaft 34 carried in similar bearings 36 bolted to the outermost left hand end of members 20.

The belts 24 can be driven in any conventional manner but, as best shown in FIG. 1, in the preferred embodiment they are driven by an electric motor and gear reducer unit 38 mounted from frame 10 by a bracket 40. The output shaft of unit 38 is drivingly connected through pulley 42 and belt 44 with a pully 46 keyed or otherwise positively connected to shaft 34.

The unit 38 could, of course, be either constant or variable speed; however, in the subject embodiment it is a constant speed unit and is connected to drive the upper runs of belts 24 to the left as viewed in FIGS. 1 and 2. Accordingly, the pans 48 or other elements on which particulate material is to be dispensed by the dispensing apparatus B are positioned on the right end of the conveyor and conveyed at a uniform speed to the left end of the conveyor. Feed to, and discharge from, the conveyor can be done manually or by associated conveyor units.

In order to assure that the pans are properly centered and oriented as they pass under the dispensing apparatus B, adjustable side guide units 50 are provided at the feed or inlet end of the conveyor. Units 50 each include vertically positioned, elongated guide plates 52 pivotally connected to pairs of parallel link arms 54 and 56. The outer ends of arms 54 and 56 are pivotally supported from the adjacent conveyor frame member 20. As shown in FIG. 1, arms 56 are supported on bolts or studs 58 which extend upwardly through members 20. Arms 54 are supported on similar studs 60. Sleeves or bushings 62, 64 are provided to maintain arms 54, 56 the proper distance above members 20.

The guide plates 52 are locked in their adjusted position by slotted bars 56 which are pivotally connected at one end to the inner end of a respective arm 56. The slotted portion of bars 66 receive thumb screws 68 which extend into threaded openings in arms 54 to clamp the bars 66 in position to prevent movement of the guide plates 52. Obviously, the guide plates 52 can be released and readjusted by releasing the thumb screws 68, readjusting the guide plates 52 to the desired position, and retightening the thumb screws.

In operation, the guide plates 52 are adjusted to a centered position relative to the dispensing apparatus B and so they just engage the outer edges of the pans or elements on which material is to be dispensed.

To provide for simultaneous and equal adjustment of the plates 52, the assemblies 50 are interconnected by a rod 70. As best seen in FIG. 2, rod 70 is pivotally connected at its opposite ends to crank arms 72 which are welded to the lower ends of studs 60. The upper ends of studs 60 are keyed or welded to arms 54 so that movement of one of arms 54 is transmitted through rod 70 to produce a corresponding but opposite movement of the other arm 54.

In the embodiment shown, the pans 48 are wide, shallow, tray-like pans of the type commonly used in baking buns and rolls. Merely for the purpose of illustrating the operation of the dispensing apparatus for a typical bakery product, hamburger bun dough pieces 74 are shown positioned on pans 48 in groups of four.

Prior to passing under the dispensing apparatus B where, for example, sesame seeds are to be deposited on the dough pieces, the pieces are preferably moistened to assure proper adherence of the seeds. For this reason, atomizing or misting water spray heads 76 are mounted above the conveyor. These spray heads form no part of the subject invention but are shown as connected to a water supply manifold 78 extending transversely of, and above the conveyor. A solenoid valve 80 is connected in manifold 78 and arranged to be controlled by a limit switch 82 adjustably mounted from the right hand frame member 22. An actuating rod 84 extends upwardly from switch 82 so that when engaged by the leading edge of a pan 48, valve 80 is opened to supply water to the heads 76 until the pan has passed completely thereunder and released the actuating rod.

With the dough pieces properly moistened, the pans then pass under the dispensing apparatus B where the seeds are deposited on each dough piece. As was discussed at some length earlier, prior dispensing apparatus either provided a curtain of seed through which the pans traveled or, alternately, provided a slide valve controlled duct system which directed seed toward the individual dough pieces. The dispensing apparatus of the subject invention overcomes problems inherent in these prior devices and is capable of dispensing variable quantities of substantially any type of particulate material which has a generally uniform particle size.

As will hereinafter become apparent, a dispensing apparatus according to the invention can take a variety of structural forms. The preferred form however, is as shown in the drawings. As shown, dispensing apparatus B includes a material holding hopper or chamber assembly 100 carried from a frame assembly 102.

The frame assembly could, and in many instances preferably would be, a portable unit completely independent of the conveyor A to allow the dispensing apparatus B to be moved about the plant and utilized with many different conveyors. In the subject embodiment however, the frame assembly 102 is connected to and supported by the conveyor frame 10. As best shown in FIGS. 1 and 3, the frame assembly 102 includes two vertically extending rods or pipes 104 and 106 which are connected at their lower ends by a plate 108 supported from conveyor frame member 16 by brackets 110. Pipes 104 and 106 also pass through a second plate 112 which is supported from frame member 20 by brackets 113. The upper ends of the pipes are joined by a horizontal plate 114.

Mounted for adjustable movement vertically on pipes 104 and 106 are relatively heavy plates 116 and 118. These plates are welded or otherwise positively connected to opposite sides of the left hand end of horizontally extending hopper support arms 120 and 122 (see FIGS. 2 and 3). The ability to vary the spacing between the hopper and the conveyor is provided by a large diameter screw rod 124 which passes through a threaded opening in plate 118. The upper end of screw rod 124 is rotatably supported from plate 114 by a collar 126. A crank handle 128 is provided for easy adjustment of the assembly.

As will hereafter become apparent, the hopper assembly 100 is preferably resiliently supported from arms 120 and 122. For this reason, a plurality of heavy mounts 130, formed from rubber or other resilient material, are connected at their upper ends by machine screws to brackets 132 welded to the sides of arms 120 and 122. Thus, the entire hopper assembly 100 is resiliently supported in cantilever fashion directly over the conveyor.

Of particular importance to the invention is the construction of hopper assembly 100 and the arrangement whereby distinct predetermined quantities of material can be dispensed in desired patterns without the use of mechanical valves or similar structures. As best illustrated in FIGS. 1 and 2, hopper assembly 100 is comprised of a relatively shallow hopper or chamber forming member 136 having vertically extending side walls 137 terminating at their upper end in a horizontally extending mounting flange 138. The flange 138 is connected to the lower end of members 130 by machine screws 139. Although not of special importance, the member 136 is preferably constructed of relatively heavy gauge stainless steel. The bottom wall of the chamber forming member is defined by a dispensing or metering plate assembly 140 which is releasably connected to inwardly extending flanges 142 formed integrally with the side walls 137 (see FIGS. 2 and 4).

The construction and functioning of the metering or dispensing plate assembly 140 can best be understood by explaining the basis for its operation. The inventor of the subject device has found that a body of particulate material of relatively uniform particle size will not pass through a mesh or other reticulated means if the openings are of uniform size and only slightly larger than the maximum average size of the material particles. This holds true so long as the mesh and the particles are relatively quiescent; however, if the mesh and/or the particles are given a relatively high frequency, short amplitude vibration, the particles will flow freely through the mesh. Immediately upon cessation of the vibration, all flow stops with a distinct sharp cut-off. Further, by controlling the frequency, and/or the amplitude, and/or the duration of the vibration, the quantity of material dispensed can be closely metered.

In the subject embodiment the above factors are utilized to provide the subject dispensing assembly. Specifically, the metering or dispensing plate assembly 140 is comprised of a plate member 144 which is cut-out or open in a predetermined pattern corresponding to the desired dispensing pattern. In the embodiment shown, the pattern takes the form of open circles 146 corresponding in placement and general size to the dough pieces 74 on the pans 48. Extending across the top surface of plate member 144 is the required reticulated means shown in the form of a wire screen 148. The screen is preferably joined to the plate 144 such as by tack welding.

The most suitable mesh or opening size for any particular material can be easily found by trial and error methods. The following chart is merely illustrative of conventional wire screen or wire cloth sizes which have been found particularly suited for dispensing the named materials:

| Material: | Mesh | Wire diameter | Dimension of side of square opening |
| --- | --- | --- | --- |
| Granulated sugar | 24 | .011" | .031" |
| Poppy seed | 16 | .016" | .0465" |
| Corn meal | 12 | .023" | .060" |
| Sesame seed | 8 | .035" | .090" |

As can be appreciated, the form of the open pattern in plate member 44 and the mesh size of screen are dictated by the particular dispensing pattern desired and the material being dispensed, respectively. For example, if it were desired to uniformly cover an entire pan with corn meal, the plate 144 would be open throughout an area equal to the pan, and a size 12 mesh would preferably be utilized. Thus, merely by changing the dispensing plate assembly 140, the apparatus can be utilized to perform a variety of dispensing functions. This constitutes a distinct advantage over prior devices which were limited in the functions they could perform.

Figure 4:
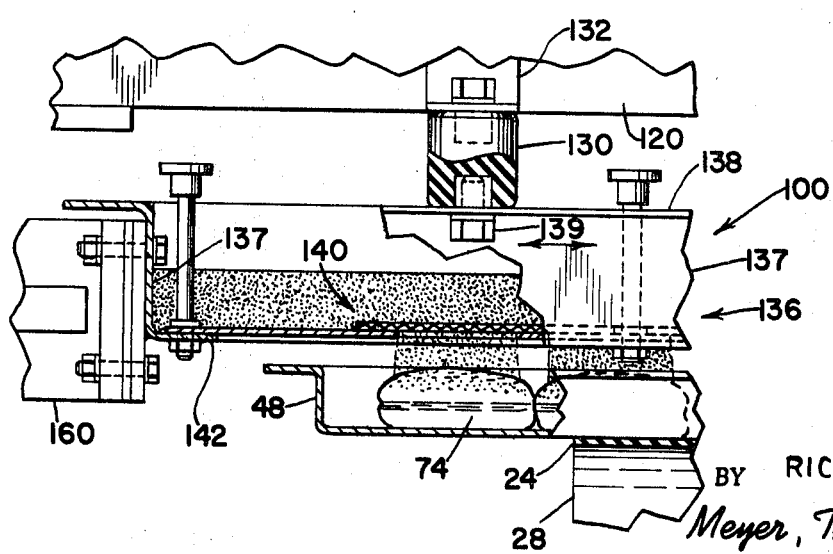
FIG. 4 is a partial view taken on line 4—4 of FIG. 2.

In order to permit the assembly 140 to be easily changed, it is releasably connected to the flange 142 of hopper assembly 100. As best shown in FIGS. 2 and 4, a plurality of clamp studs 152 are relatively uniformly spaced about the periphery of plate assembly 140. The studs 152 have a shoulder 153 which engages the top surface of plate member 144. The threaded end 154 of each stud passes through aligned openings in the plate 144 and flange 142 and is received in a nut 156 tack welded to the underside of flange 142. The studs preferably extend upwardly a distance sufficient to position their upper end above the top of hopper assembly 100. Additionally, finger wheels 158 are preferably provided to facilitate tightening and removal of the studs.

As previously mentioned, if the mesh is the proper size for the material being dispensed, substantially none of the material will pass therethrough when the assembly is stationary and undisturbed. Vibration however, will cause the material to pass freely through the mesh. For this reason, power means is provided for vibrating the assembly 100 whenever the pan or other surface on which material is to be dispensed is in position beneath the assembly. This power means could be of many types. In the preferred embodiment it comprises a conventional air operated vibrator 160 which is bolted centrally of the left end of the chamber forming member 136. The vibrator shown is sold by the Cleveland Vibrator Company under their model number KOAC—2. It vibrates in the range of from about 2,670 cycles per minute at 40 psi air pressure up to 3,800 cycles per minute at 80 psi air pressure. This range has been found to be especially suited for dispensing the above-noted materials.

Although a variety of control means can obviously be provided, in the subject system means are provided to permit the following to be sensed or varied:

a. Sense the presence of a pan or receiving surface beneath the dispensing assembly;
b. Selectively vary the duration of vibration; and
c. Selectively vary the frequency and power of the vibration.

The preferred control arrangement for accomplishing the above comprises a pan sensing limit switch 164 positioned under the top run of the conveyor belts. An actuation arm 166 extends upwardly for engagement by the leading edge of a pan 48 to thereby close the switch and initiate operation of vibrator 160. Although not shown, the switch 164 is mounted for adjustment longitudinally of the conveyor so that it can be repositioned for different pan sizes, etc. As shown, the switch 164 is connected through a conventional off-delay timer 168 to a normally closed solenoid valve 170 which controls the supply of air to the vibrator. As can be appreciated, this arrangement permits the duration of the vibration initiated by closing of switch 164 to be set even though the switch is maintained closed. Normally, a vibration time in the range of around .1 sec. is adequate for the materials and screen sizes noted above.

The frequency and power of the vibrations are controlled by the adjustable pressure control valve 172 in the air supply line. By adjusting the air pressure to the vibrator, it is thus possible to vary the quantity of material dispensed without regard to the duration of the vibration.

As can be readily seen from the aforegoing description, the subject invention provides a highly versatile and simple dispensing apparatus. In operation, the apparatus has resulted in savings in the material dispensed in range of 40 percent when compared to other commercially available units.

I claim:

1. Apparatus for depositing particulate material in a predetermined pattern onto moving members having upwardly facing surfaces; said apparatus comprising: conveyor means for conveying said members horizontally past a predetermined position; frame means extending upwardly adjacent one side of said conveyor means and including laterally extending and vertically adjustable cantilever support arms; mounting means carried by said support arms for resiliently supporting a hopper means above said conveyor at said predetermined position; said hopper means including at least a portion which is manually removable and which includes a downwardly facing lower wall which is open in said predetermined pattern; reticulated means connected to said lower wall and extending across said open pattern; said reticulated means having a multiplicity of closely spaced openings therein with each opening having a cross-section only slightly larger than the maximum average cross-section of the particles of said particulate material; selectively actuable power means carried by said hopper means for imparting a high frequency; small amplitude vibration to said reticulated means; and control means, including means to sense the approach of said members to said position and to actuate said power means when said members are substantially at said position.

2. The apparatus as defined in claim 1 wherein said control means includes means for varying the time period for which said power means is actuated.

3. The apparatus as defined in claim 1 wherein said control means includes means for varying the amplitude of the vibration produced by said power means.

4. The apparatus as defined in claim 1 wherein said power means comprises an air operated vibrator connected to said hopper means.

5. The apparatus as defined in claim 1 including means permitting said predetermined pattern to be selectively varied.

6. The apparatus as defined in claim 1 wherein said frame means is supported from said conveyor means and wherein said hopper means is pendantly supported from said frame means.

7. Apparatus for depositing particulate material in a predetermined pattern onto moving material receiving members having upwardly facing surfaces comprising: a pair of vertically extending support members; support arms carried by said support members and extending laterally therefrom; adjusting means connected between said support arms and said support members for adjusting said arms vertically of said support members; a hopper having side walls and a bottom wall; resilient connecting means depending from said arms and pendantly supporting said hopper with its bottom wall extending horizontally; said bottom wall being open throughout said predetermined pattern and having reticulated means connect across said open pattern; said reticulated means having a multiplicity of closely spaced openings therein with each opening having a cross-section only slightly larger than the maximum average cross-section of the particles of said material being dispensed; said bottom wall being releasably connected to said side walls by manually releasable connecting means for permitting said bottom wall and said reticulated means to be changed; high frequency power vibrating means connected to said side walls for imparting vibrations to said hopper to cause material therein to be dispensed through said reticulated means; and, control means, including sensing means for sensing the approach of material receiving members to a position beneath said hopper and actuating said vibrating means when said members are substantially at said position.